(12) United States Patent
Smith et al.

(10) Patent No.: US 10,358,966 B2
(45) Date of Patent: Jul. 23, 2019

(54) LIMITING EXPOSURE OF ZEOLITE CONTAINING AFTERTREATMENT COMPONENTS TO RICH EXHAUST CONDITIONS

(71) Applicant: GM Global Technology Operations LLC, Detroit, MI (US)

(72) Inventors: Michael A. Smith, Clarkston, MI (US); Christopher L. Whitt, Howell, MI (US); Sarah Funk, Canton, MI (US); Shouxian Ren, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 32 days.

(21) Appl. No.: 15/711,304

(22) Filed: Sep. 21, 2017

(65) Prior Publication Data
US 2019/0085747 A1 Mar. 21, 2019

(51) Int. Cl.
*F01N 3/08* (2006.01)
*F01N 3/22* (2006.01)

(52) U.S. Cl.
CPC .......... *F01N 3/22* (2013.01); *F01N 3/08* (2013.01); *F01N 3/0864* (2013.01); *F01N 2370/04* (2013.01); *F01N 2430/00* (2013.01); *F01N 2570/16* (2013.01); *F02D 2250/18* (2013.01)

(58) Field of Classification Search
CPC . F01N 3/22; F01N 3/0864; F01N 3/08; F01N 2430/00; F01N 2370/04; F01N 2570/16; F02D 2250/18
See application file for complete search history.

(56) References Cited

U.S. PATENT DOCUMENTS 6,321,530 B1 * 11/2001 Hoshi ................... F01N 13/009
60/274

\* cited by examiner

*Primary Examiner* — Brandon D Lee
(74) *Attorney, Agent, or Firm* — Cantor Colburn LLP

(57) ABSTRACT

Technical solutions are described for limiting exposure of components of an emissions control system to rich exhaust conditions. An example an emissions control system includes an oxygen storage component; and a controller that limits exposure of the oxygen storage component to rich exhaust conditions. The limiting includes determining an air-to-fuel equivalence ratio in exhaust gas in response to an engine receiving a request to generate torque, the request including a displacement of a pedal; determining an amount of oxygen in the exhaust gas based on the air-to-fuel equivalence ratio; determining an oxygen level stored by the oxygen storage component; and if the oxygen level is above a predetermined threshold, lowering a torque generation rate of the engine, which specifies amount of torque generated per unit displacement of the pedal.

17 Claims, 4 Drawing Sheets

LIMITING EXPOSURE OF ZEOLITE CONTAINING AFTERTREATMENT COMPONENTS TO RICH EXHAUST CONDITIONS

INTRODUCTION

The subject disclosure relates to exhaust systems in a vehicle, and particularly to limiting exposure of zeolite containing after-treatment components in the exhaust systems to rich exhaust conditions.

An exhaust gas treatment system for diesel engines generally includes a diesel oxidation catalyst (DOC) and a diesel particulate filter (DPF) which is arranged downstream of the DOC. The DOC oxidizes and converts hydrocarbon (HC) and carbon monoxide (CO) in exhaust gas, and oxidizes, among nitrogen oxides (NOx), nitrogen monoxide (NO) into nitrogen dioxide (NO2). The heat of catalytic reaction generated by the DOC increases the temperature of the DPF, and the high oxidizability of NO2 promotes combustion of particulate matters (PMs) deposited on the DPF. Because activity of the DOC is low immediately after start-up of the engine, zeolite is provided for the DOC as an HC trapping material to prevent HC from being exhausted without being converted.

On the other hand, a lean NOx trap catalyst (LNT catalyst) is also utilized in lean-burn gasoline engines or diesel engines to purify NOx. An NOx storage material in the LNT catalyst stores NOx when the air-fuel ratio of an exhaust gas is lean. A rich purge changes the air-fuel ratio in the engine to rich, and releases NOx and reduces NOx with unburned gas.

SUMMARY

In one exemplary embodiment an emissions control system that limits exposure of components of the emissions control system to rich exhaust conditions includes an oxygen storage component, and a controller that limits exposure of the oxygen storage component to rich exhaust conditions. The limiting includes determining an air-to-fuel equivalence ratio in exhaust gas in the emissions control system in response to an engine receiving a request to generate torque, the request including a displacement of a pedal. The limiting further includes determining an amount of oxygen in the exhaust gas based on the air-to-fuel equivalence ratio, and determining an oxygen level stored by the oxygen storage component. The limiting further includes, in response to the oxygen level being above a predetermined threshold, lowering a torque generation rate of the engine, the torque generation rate specifying amount of torque generated per unit displacement of the pedal, where the engine generates an amount of torque based on the torque generation rate of the engine.

In one or more examples, the controller further resets the torque generation rate of the engine after a predetermined duration since lowering the torque generation rate.

In one or more examples, the predetermined threshold is a first predetermined threshold, and the controller further, in response to the oxygen level being above a second predetermined threshold, delays the request for generating torque by a predetermined threshold. In one or more examples, the second predetermined threshold is greater than the first predetermined threshold.

In one or more examples, the controller further monitors a temperature of the emissions control system. Further, the controller limits the exposure of components of the emissions control system components to rich exhaust conditions in response to the temperature being above a predetermined temperature threshold.

In one or more examples, determining the oxygen level stored by the component is based on an oxygen storage component model. In one or more examples, the oxygen storage component includes a zeolite based catalyst.

According to one or more embodiments a computer implemented method for limiting exposure of components of an emissions control system components to rich exhaust conditions includes receiving, by a controller, a request to generate torque by an engine, the request including a displacement of a pedal, and limiting exposure of a component of the emissions control system components to rich exhaust conditions. In one or more examples the limiting includes determining, by the controller, an air-to-fuel equivalence ratio in exhaust gas in the emissions control system. The limiting further includes determining, by the controller, an amount of oxygen in the exhaust gas based on the air-to-fuel equivalence ratio, and determining, by the controller, an oxygen level stored by the component. The limiting further includes, in response to the oxygen level being above a predetermined threshold, lowering, by the controller, a torque generation rate of the engine, the torque generation rate specifying amount of torque generated per unit displacement of the pedal. The limiting further includes generating, by the engine, an amount of torque based on the torque generation rate of the engine.

In one or more examples, the method further includes resetting, by the controller, the torque generation rate of the engine after a predetermined duration since lowering the torque generation rate.

In one or more examples, the predetermined threshold is a first predetermined threshold, and the method further includes in response to the oxygen level being above a second predetermined threshold, delaying the request for generating torque by a predetermined threshold. In one or more examples, the second predetermined threshold is greater than the first predetermined threshold.

In one or more examples, the method further includes monitoring, by the controller, a temperature of the emissions control system. Further yet, the method may also include limiting the exposure of components of the emissions control system components to rich exhaust conditions in response to the temperature being above a predetermined temperature threshold.

In one or more examples, the component is an oxygen storage component, and determining the oxygen level stored by the component is based on an oxygen storage component model. In one or more examples, the oxygen storage component includes a zeolite based catalyst.

According to one or more embodiments a computer program product for an emissions control system includes a computer readable storage medium having program instructions embodied therewith, the program instructions executable by a controller to cause the controller to limiting exposure of a component of the emissions control system to rich exhaust conditions. In one or more examples, the limiting includes determining an air-to-fuel equivalence ratio in exhaust gas in the emissions control system in response to an engine receiving a request to generate torque, the request including a displacement of a pedal. The limiting further includes determining an amount of oxygen in the exhaust gas based on the air-to-fuel equivalence ratio, and determining an oxygen level stored by the component. The limiting further includes, in response to the oxygen level being above a predetermined threshold, lowering a torque generation rate of the engine, the torque generation rate specifying amount of torque generated per unit displacement of the pedal, where the engine generates an amount of torque based on the torque generation rate of the engine.

In one or more examples, the controller resets the torque generation rate of the engine after a predetermined duration since lowering the torque generation rate.

In one or more examples, the predetermined threshold is a first predetermined threshold, and the controller, in response to the oxygen level being above a second predetermined threshold, delays the request for generating torque by a predetermined threshold.

In one or more examples, the controller further: monitors a temperature of the emissions control system, and limits the exposure of components of the emissions control system components to rich exhaust conditions in response to the temperature being above a predetermined temperature threshold.

In one or more examples, the components are zeolite based oxygen storage components. Further, determining the oxygen level stored by the component is based on an oxygen storage component model. In one or more examples, limiting exposure of zeolite containing aftertreatment components to rich exhaust conditions.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
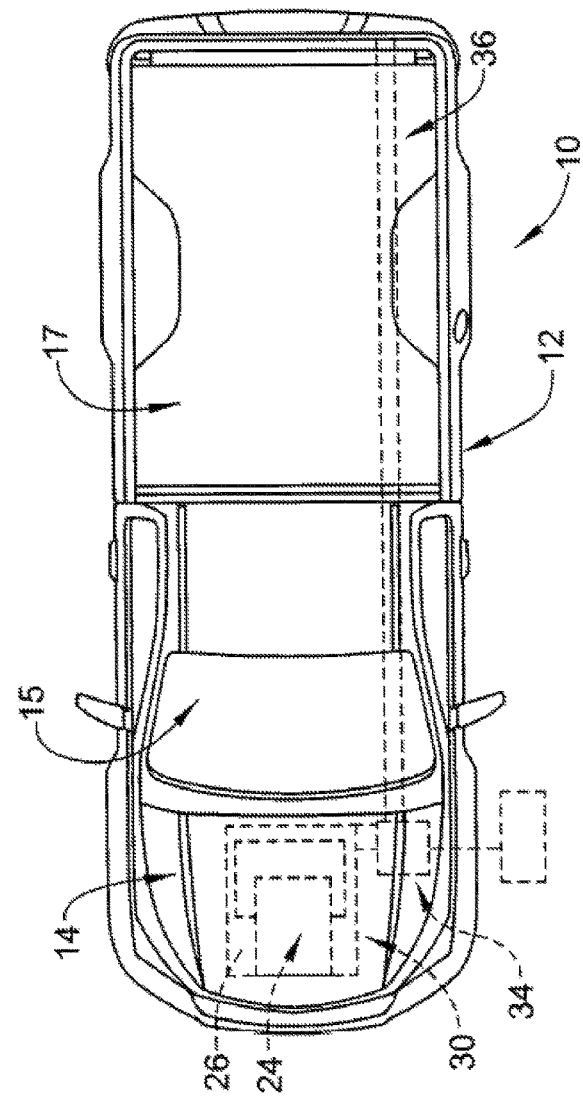
FIG. 1 depicts a motor vehicle including an internal combustion engine and an emission control system according to one or more embodiments.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment exhaust systems are described in which torque demands from an engine are modified based on limiting accelerated aging of aftertreatment components that contain zeolite materials for storage, while minimizing vehicle operator perception.

A motor vehicle, in accordance with an aspect of an exemplary embodiment, is indicated generally at 10 in FIG. 1. Motor vehicle 10 is shown in the form of a pickup truck. It is to be understood that motor vehicle 10 may take on various forms including automobiles, commercial transports, marine vehicles, and the like. Motor vehicle 10 includes a body 12 having an engine compartment 14, a passenger compartment 15, and a cargo bed 17. Engine compartment 14 houses an internal combustion engine system 24, which, in the exemplary embodiment shown, may include a diesel engine 26. Internal combustion engine system 24 includes an exhaust system 30 that is fluidically connected to an aftertreatment or emissions control system 34. Exhaust produced by internal combustion engine (ICE) system 24 passes through emissions control system 34 to reduce emissions that may exit to ambient through an exhaust outlet pipe 36.

It should be noted that technical solutions described herein are germane to ICE systems that can include, but are not limited to, diesel engine systems and gasoline engine systems. The ICE system 24 can include a plurality of reciprocating pistons attached to a crankshaft, which may be operably attached to a driveline, such as a vehicle driveline, to power a vehicle (e.g., deliver tractive torque to the driveline). For example, the ICE system 24 can be any engine configuration or application, including various vehicular applications (e.g., automotive, marine and the like), as well as various non-vehicular applications (e.g., pumps, generators and the like). While the ICEs may be described in a vehicular context (e.g., generating torque), other non-vehicular applications are within the scope of this disclosure. Therefore, when reference is made to a vehicle, such disclosure should be interpreted as applicable to any application of an ICE system.

Moreover, an ICE can generally represent any device capable of generating an exhaust gas stream comprising gaseous (e.g., $NO_x$, $O_2$), carbonaceous, and/or particulate matter species, and the disclosure herein should accordingly be interpreted as applicable to all such devices. As used herein, "exhaust gas" refers to any chemical species or mixture of chemical species which may require treatment, and includes gaseous, liquid, and solid species. For example, an exhaust gas stream may contain a mixture of one or more $NO_x$ species, one or more liquid hydrocarbon species, and one more solid particulate species (e.g., ash). It should be further understood that the embodiments disclosed herein may be applicable to treatment of effluent streams not comprising carbonaceous and/or particulate matter species, and, in such instances, ICE 26 can also generally represent any device capable of generating an effluent stream comprising such species. Exhaust gas particulate matter generally includes carbonaceous soot, and other solid and/or liquid carbon-containing species which are germane to ICE exhaust gas or form within an emissions control system 34.

The emissions control system 34 includes hydrocarbon trapping components based on zeolites. For example, for cold start hydrocarbon control, the zeolite based components adsorbs and stores hydrocarbons during the start-up period and releases the stored hydrocarbons when the exhaust temperature is high enough to desorb hydrocarbons. The desorbed hydrocarbons are subsequently converted when the downstream catalytic components reach their operating temperature.

Alternatively, or in addition, for cold start NOx control, especially under lean-burn conditions, NOx storage and release catalysts are used. The catalysts adsorb NOx during the warm-up period and thermally desorb NOx at higher exhaust temperatures. Downstream catalysts, such as selective catalytic reduction ("SCR") or NOx adsorber catalysts ("NAC"), effectively reduce the desorbed NOx to nitrogen. Typically, NOx adsorbent materials consist of inorganic oxides such as alumina, silica, ceria, zirconia, titania, or mixed oxides which are coated with at least one platinum group metal.

Alternatively, or in addition, cold start catalyst also use zeolite catalysts which may include a base metal, a noble metal, and a zeolite. For example, the base metal is iron, copper, manganese, chromium, cobalt, nickel, tin, or mixtures thereof; more preferably, iron, copper, manganese, cobalt, or mixtures thereof. The noble metal is palladium, platinum, rhodium, silver, or mixtures thereof. The zeolite may be any natural or a synthetic zeolite, including molecular sieves, and is preferably composed of aluminum, silicon, and/or phosphorus. Zeolite based cold start catalyst provides enhanced cleaning of the exhaust gases from internal combustion engines compared to inorganic oxides. The zeolite based components in the emissions control system 34 facilitate storage of NOx in cold start. The stored NOx is released later in the cycle when a NOx reduction system is warm enough to effectively operate.

A technical challenge with using zeolite based catalysts has been that upon exposure to rich exhaust conditions, the storage features of the zeolite based components are degraded beyond expected use from thermal treatment. For example, upon exposure to the rich exhaust conditions the exchanged active metals in the zeolite are varied in oxidation state causing a loss of storage capacity of the zeolite based catalysts. The technical solutions described herein address the technical challenge above, among others, by modifying torque demands of the ICE 26 based on limiting accelerated aging of aftertreatment components of the emissions control system 34, particularly the components that contain zeolite materials for storage, while minimizing operator perception of the reduced/affected torque generation. The technical solutions herein thus provide an improved emissions control system 34. Similar effect is observed in SCR components using zeolite based components.

A rich fuel condition occurs in the emissions control system 34 when the air to fuel ratio is less than a predetermined ratio, such as 14.7:1. The predetermined ratio is considered the perfect blend of air to fuel mixture or stoichiometric air fuel ratio. This is when there are just enough parts of air to burn one part of fuel with no excess oxygen or fuel left over. Faulty components such as dripping fuel injectors, faulty fuel pressure regulators, ECT's and stuck open thermostats may cause rich conditions.

Figure 2:
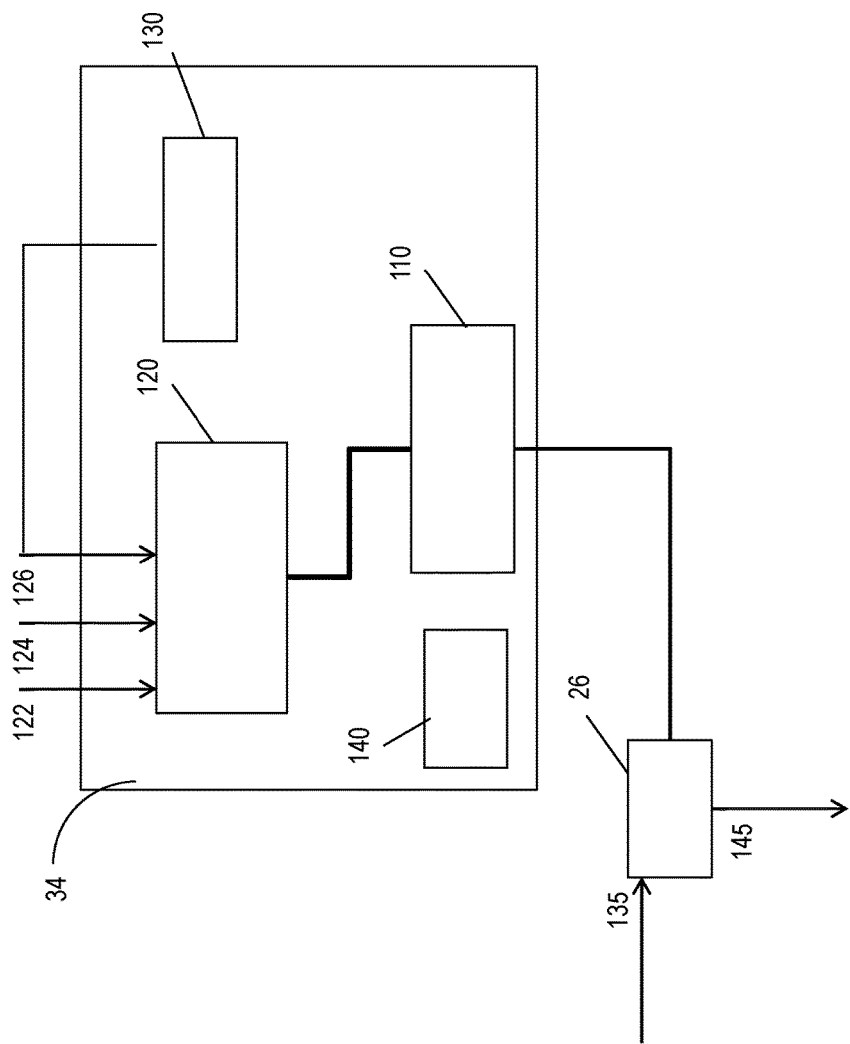
FIG. 2 depicts a block diagram of an example system for limiting exposure of zeolite containing aftertreatment components to rich exhaust conditions according to one or more embodiments.

FIG. 2 depicts a block diagram of an example system for limiting exposure of zeolite containing aftertreatment components to rich exhaust conditions according to one or more embodiments. The system includes, among other components, the emissions control system 34, or the aftertreatment system, which is in communication with the engine 26. In one or more examples, a controller 110 controls the operation of the emissions control system 34. It should be noted that although the controller is shown as part of the emissions control system 34 in FIG. 2, the controller 110 may be independent in other examples. Further, in one or more examples, the controller 110 may also control the operation of the engine 26. Alternatively, or in addition, the controller 110 may be in communication with another controller that controls the operation of the engine 26. In the example described herein, the controller 110 is considered to be controlling the operation of the emissions control system 34 and also the engine 26.

In one or more examples, the emissions control system 34 further includes an oxygen storage component (OSC) model 120 that predicts the amount of oxygen to which the storage components are being exposed. The OSC model 120 determines the predicted amount of oxygen based on total exhaust flow 122 in the emissions control system 34, a temperature 124 of the emissions control system 34, and an air to fuel ratio 126.

The total exhaust flow 122 is the amount of exhaust gas flowing through the emissions control system 34. In one or more examples, the total exhaust flow 122 is measured using a flow-rate measurement sensor at the inlet of the emissions control system 34. One or more temperature sensors measure the temperature 124 of the emissions control system 34.

In one or more examples, the controller 110 monitors the air-to-fuel ratio 126 using a rich conditions model 130. The rich conditions model 130 in turn monitors the amounts of CO and H2 into which the exhaust gas has been reduced. In one or more examples, the rich conditions model 130 uses one or more sensors to monitor the amounts of CO and H2. For example, one or more sensors 140 measure the amount of residual oxygen (for lean mixes) or unburnt hydrocarbons (for rich mixtures) in the exhaust gas. Alternatively, or in addition, rich conditions model 130 uses predictive model based on the chemical process that occurs in the emissions control system 34 to reduce the exhaust gas.

In one or more examples, the OSC model 120 and the rich conditions model 130 are implemented by one or more separate modules, such as integrated circuits, which in turn may be implemented using ASICs, FPGAs, a processor, or any other type of electronic circuit.

The controller 110 receives the predicted oxygen levels by the OSC model 120. The controller checks the predicted oxygen level with one or more predetermined threshold levels. Based on the result of the comparison(s), the controller 110 adjusts the torque shaping of the engine 26. For example, the controller 110 may change the torque demand of the engine 26, such as by adjusting a torque generation rate of the engine 26 with respect to user input, such as pedal displacement 135 of a pedal. For example, the engine 26 generates a torque 145 based on the pedal displacement 135, where the pedal displacement 135 causes a corresponding fuel injection into the engine 26. Accordingly, based on the amount of fuel injected corresponding to the pedal displacement 135, the engine 26 generates a corresponding amount of torque 145 based on the torque generation rate.

The controller 110 resets the torque generation rate after a duration, such as 200 microseconds, 500 microseconds, 1 second, or any other time interval since adjusting the rate. Alternatively, or in addition, the controller 110 changes the duration for which the engine 26 generates torque 145 based on the adjusted torque generation rate based on the output of the OSC model.

In one or more examples, the controller 110 limits the exposure of the zeolite based components to oxygen when the temperature 124 of the emissions control system 34 is at least a predetermined temperature.

Thus, the controller 110 momentarily adjusts torque demand based on aftertreatment protection algorithm to minimize exposure of oxygen (and oxides, such as CO) to zeolite based aftertreatment components at high temperatures, by accounting for an OSC model of the upstream risk component and taking measures to reduce the rate of torque demand or to delay the torque command until the system can adequately tolerate the impact to aging.

Figure 3:
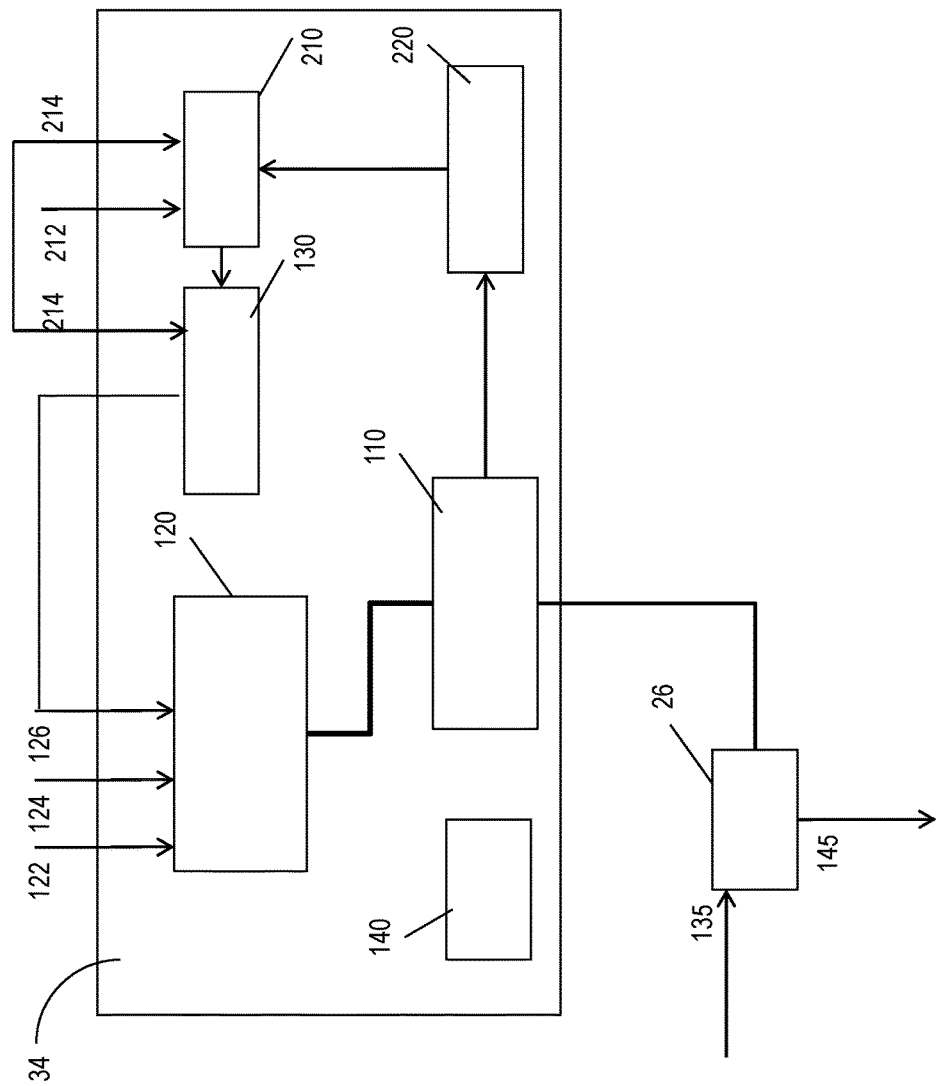
FIG. 3 depicts a block diagram of another example of system for limiting exposure of zeolite containing aftertreatment components to rich exhaust conditions according to one or more embodiments.

FIG. 3 depicts a block diagram of another example system for limiting exposure of zeolite containing aftertreatment components to rich exhaust conditions, according to one or more embodiments. The illustration depicts the controller 110 using an engine model 210 to predict the torque 145 generated by the engine 26 based on an input amount of air 212 and an input amount of fuel 214 into the engine 26. The input amount of fuel 214, as described earlier, corresponds to the pedal displacement 135 or any other user input to demand torque generation. The engine model 210 determines total flow of the exhaust gas 122 by receiving the monitored amount of air 212 and amount of fuel 214 being input into the engine 26. For example, the received input values are from one or more sensors 140. The engine model 210 provides an emulation of the operation of the engine 26 and predicts an amount of oxygen content in the exhaust gas. In one or more examples, the input amount of fuel 214 is also received by the rich conditions model 130 that computes the air-to-fuel ratio, among other values to determine exposure of zeolite based components in the emissions control system 34 to oxygen/oxides.

Thus, the technical solutions herein facilitate monitoring and/or predicting one or more values in the emissions control system 34 to compute air-to-fuel ratio in the engine 26. The air-fuel ratio is the mass ratio of air to a solid, liquid, or gaseous fuel present in a combustion process in the engine 26. Based on the air-fuel ratio, the controller determines how much torque is being generated by the engine 26, and richness of the exhaust gas resulting from the reaction/combustion in the engine 26. If exactly enough air is provided to completely burn all of the fuel input to the engine 26, the ratio is known as the stoichiometric mixture (stoich). If the air-fuel ratio is lower than the predetermined stoichiometric value, the exhaust gas is considered "rich". Rich mixtures are less efficient, but may produce more power and burn cooler. An air-fuel ratio higher than the predetermined stoichiometric value is considered "lean." Lean mixtures are more efficient but may produce higher levels of nitrogen oxides. For precise air-fuel ratio calculations, the oxygen content of combustion air is specified because of possible dilution by ambient water vapor, or enrichment by oxygen additions. It should be noted that in one or more examples, the controller 110 computes air-fuel equivalence ratio ($\lambda$), which is the ratio of the air-fuel ratio to the predetermined stoichiometry value for a given mixture. Thus, $\lambda=1.0$ is at stoichiometry, rich mixtures $\lambda<1.0$, and lean mixtures $\lambda>1.0$.

In one or more examples, the emissions control system 34 further includes a torque rate merge module 220 that facilitates transitioning the engine model 210 and the engine 26 from a first torque generation rate to a second (adjusted) torque generation rate from the controller 110. For example, the torque rate merge module 220 ensures that the torque generation rate of the engine 26 does not change abruptly causing discomfort for the operator and/or passengers of the vehicle 10, for example because of a sudden jerking. For example, the torque rate merge module 220 updates the rate from the first rate to the second rate in predetermined intervals.

Further, in one or more examples, the engine model 210 predicts the oxygen exposure of the zeolite based components using the adjusted torque generation rate. The controller 110 ensures that the adjusted rate limits the exposure below the predetermined threshold level(s). Upon confirmation, the controller 110 proceeds to update the torque generation rate of the engine 26, else the controller 110 changes the torque generation rate further until the oxygen exposure is limited to satisfactorily. The controller 110 proceeds to adjust the torque generation rate of the engine 26 as described earlier.

Figure 4:
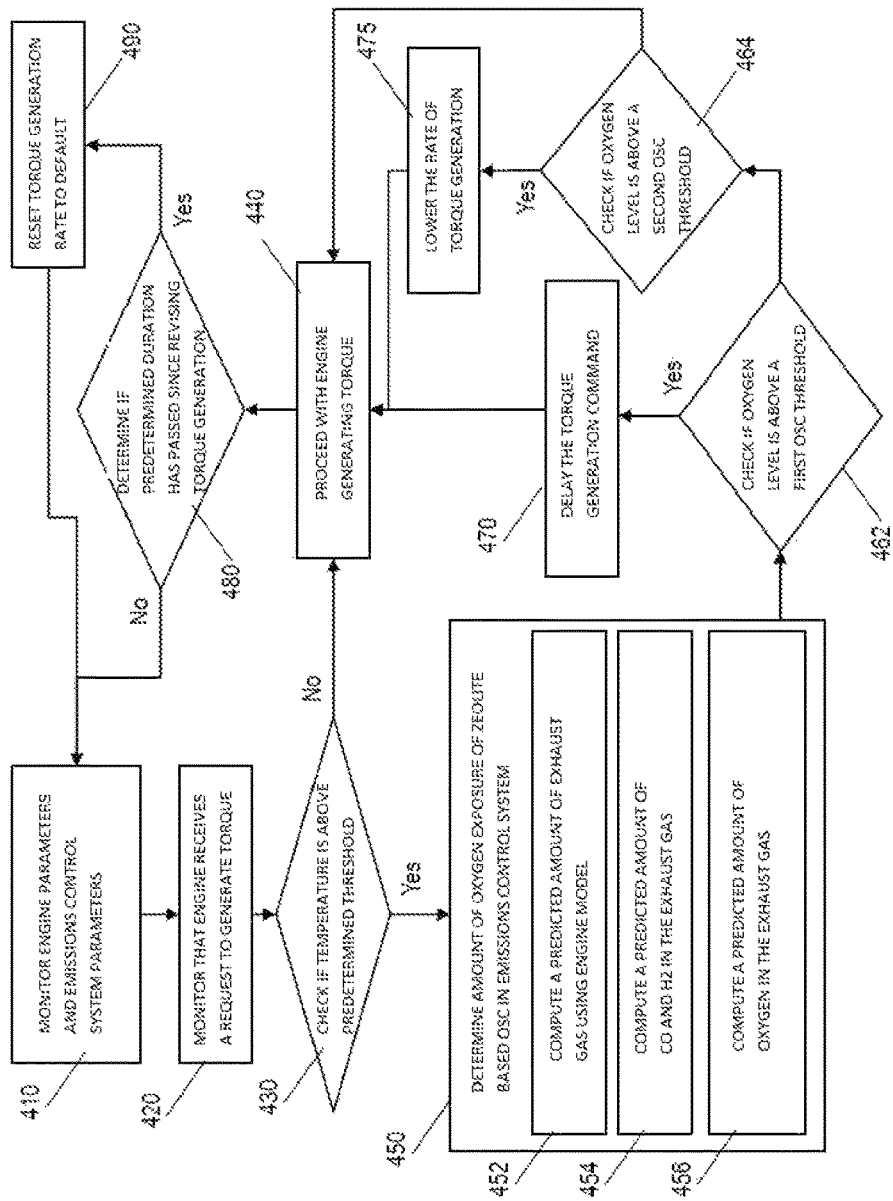
FIG. 4 illustrates a flowchart of an example method for limiting exposure of zeolite containing aftertreatment components to rich exhaust conditions according to one or more embodiments.

FIG. 4 illustrates a flowchart of an example method for limiting exposure of zeolite containing aftertreatment components to rich exhaust conditions according to one or more embodiments. The controller 110 monitors engine parameters and emissions control system parameters, at block 410. As described herein, the engine parameters include among others, air intake 212, fuel input 214, pedal displacement 135, or any other parameters associated with operation of the engine 26. Further, the emissions control system parameters include, total exhaust gas flow 122 at intake, temperature 124, and air to fuel ratio 126 (or air-fuel equivalence ratio), among other parameters associated with the emissions control system 34. The controller 110 monitors the parameters using one or more sensors 140. Alternatively, or in addition, the controller 110 computes one or more of the parameters using corresponding prediction models, such as the catalyst oxygen storage component model 120, the rich condition model 130, the engine model 210, and others.

The method further includes the controller 110 monitoring that the engine 26 receives a request to generate torque, at block 420. The controller 110 checks if the temperature 124 is above a predetermined threshold, such as 300° C., 450° C., or any other, at block 430. If the temperature is below the threshold, the controller 110 proceeds with the engine 26 generating the torque requested using the torque generation rate configured for the engine 26, at block 440. In one or more examples, the engine has a default torque generation rate that is dynamically configurable within predetermined limits by the controller 110.

Alternatively, if the temperature 124 is above the predetermined threshold, the controller 110 determines amount of oxygen exposure of zeolite based oxygen storage components (OSC) in the emissions control system 34, at block 450. The controller uses the OSC model 120 for determining the oxygen exposure of the zeolite based components. The OSC model 120 computes amount of oxygen stored by the zeolite based components based on the engine parameters and the emissions control system parameters.

For example, computing the oxygen exposure includes computing a predicted amount of exhaust gas using the engine model 210, at block 452. Further, the rich conditions model 130 computes a predicted amount of CO and H2 in the exhaust gas, at block 454. Further, the controller 110 computes a predicted amount of oxygen in the exhaust gas to which the zeolite based components get exposed based on O2 sensors and predicted amount of CO and H2, at block 456.

The controller 110 further checks if the oxygen level is above one or more OSC thresholds, at block 462 and 464. For example, if the oxygen level is above a first OSC threshold, the controller 110 delays the torque generation command, at blocks 462 and 470. The first threshold may correspond to a high oxygen level in the exhaust gas that may adversely affect efficiency and life of the zeolite based components of the emissions control system 34. Thus, if the amount of oxygen that the zeolite components will be exposed to is above the first threshold, the controller 110 delays further torque generation for a predetermined duration so that the amount of oxygen in the exhaust gas reduces, thus extending storage capacity and efficiency of the zeolite components. In one or more examples, the torque generation is delayed by a predetermined duration such as 200 microseconds, 500 microseconds, or the like, so that the operator/passengers are not discomforted.

Alternatively, if the oxygen level is lower than the first threshold, the controller 110 checks if the oxygen level is higher than a second threshold, at block 464. The second threshold may correspond to a relatively lower value in comparison to the first threshold. If the oxygen level is above the second threshold, the controller 110 lowers the rate of torque generation of the engine 26, at block 475. The torque generation rate adjusts the amount of torque generated for the displacement of the pedal or any other input received by the engine 26 for requesting the additional torque. The engine 26 proceeds to generate the torque using the revised torque generation rate, at block 440.

The method further includes determining if a predetermined duration has passed since revising the torque generation rate, at block 480; for example, if the torque generation rate has been lowered for a predetermined duration. For example, the predetermined duration to maintain the revised torque rate may be 500 microseconds, 1 second, or the like. Once the predetermined duration expires, the controller 110 resets the torque generation rate of the engine 26 to the default torque generation rate, at block 490. If the duration has not expired, the system continues to use the revised (lowered) torque generation rate.

The technical solutions herein thus facilitate limiting exposure of zeolite based components, and other components in the emissions control system to rich conditions in the exhaust gases. Particularly in case of the zeolite based components, such limiting facilitates improving efficiency and life of the components. The technical solutions herein facilitate such improvement by controlling torque generation by the engine of a vehicle.

It should be noted that although the examples of implementation are described in the context of a vehicle, the technical solutions herein are applicable for any emissions control system that is used for after treatment of exhaust gases produced by an engine.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An emissions control system that limits exposure of components of the emissions control system to rich exhaust conditions, the emissions control system comprising:
    an oxygen storage component; and
    a controller configured to limit exposure of the oxygen storage component to rich exhaust conditions, the limiting comprising:
        determining an air-to-fuel equivalence ratio in exhaust gas in the emissions control system in response to an engine receiving a request to generate torque, the request including a displacement of a pedal;
        determining an amount of oxygen in the exhaust gas based on the air-to-fuel equivalence ratio;
        determining an oxygen level stored by the oxygen storage component; and
        in response to the oxygen level being above a predetermined threshold, lowering a torque generation rate of the engine, the torque generation rate specifying amount of torque generated per unit displacement of the pedal, wherein the engine generates an amount of torque based on the torque generation rate of the engine, wherein the oxygen storage component comprises a zeolite based catalyst.

2. The emissions control system of claim 1, wherein the controller is further configured to reset the torque generation rate of the engine after a predetermined duration since lowering the torque generation rate.

3. The emissions control system of claim 1, wherein the predetermined threshold is a first predetermined threshold, and the controller is further configured to in response to the oxygen level being above a second predetermined threshold, delay the request for generating torque by a predetermined threshold.

4. The emissions control system of claim 3, wherein the second predetermined threshold is greater than the first predetermined threshold.

5. The emissions control system of claim 1, wherein the controller is further configured to:
    monitor a temperature of the emissions control system; and
    wherein, the controller limits the exposure of components of the emissions control system components to rich exhaust conditions in response to the temperature being above a predetermined temperature threshold.

6. The emissions control system of claim 1, wherein determining the oxygen level stored by the component is based on an oxygen storage component model.

7. A computer implemented method for limiting exposure of components of an emissions control system components to rich exhaust conditions, the method comprising:
    receiving, by a controller, a request to generate torque by an engine, the request including a displacement of a pedal; and
    limiting exposure of a component of the emissions control system components to rich exhaust conditions, the limiting comprising:
        determining, by the controller, an air-to-fuel equivalence ratio in exhaust gas in the emissions control system;
        determining, by the controller, an amount of oxygen in the exhaust gas based on the air-to-fuel equivalence ratio;
        determining, by the controller, an oxygen level stored by the component;
        in response to the oxygen level being above a predetermined threshold, lowering, by the controller, a torque generation rate of the engine, the torque generation rate specifying amount of torque generated per unit displacement of the pedal; and
        generating, by the engine, an amount of torque based on the torque generation rate of the engine, wherein the component comprises a zeolite based catalyst.

8. The computer implemented method of claim 7, wherein the method further comprises resetting, by the controller, the torque generation rate of the engine after a predetermined duration since lowering the torque generation rate.

9. The computer implemented method of claim 7, wherein the predetermined threshold is a first predetermined threshold, and the method further comprises in response to the oxygen level being above a second predetermined threshold, delaying the request for generating torque by a predetermined threshold.

10. The computer implemented method of claim 9, wherein the second predetermined threshold is greater than the first predetermined threshold.

11. The computer implemented method of claim 7, further comprising:
monitoring, by the controller, a temperature of the emissions control system; and
limiting the exposure of components of the emissions control system components to rich exhaust conditions in response to the temperature being above a predetermined temperature threshold.

12. The computer implemented method of claim 7, wherein the the step of determining the oxygen level stored by the component is based on an oxygen storage component model.

13. A computer program product for an emissions control system, the computer program product comprising a non-transitory computer readable storage medium having program instructions embodied therewith, the program instructions executable by a controller to cause the controller to limiting exposure of a component of the emissions control system to rich exhaust conditions, the limiting comprising:
determining an air-to-fuel equivalence ratio in exhaust gas in the emissions control system in response to an engine receiving a request to generate torque, the request including a displacement of a pedal;
determining an amount of oxygen in the exhaust gas based on the air-to-fuel equivalence ratio;
determining an oxygen level stored by the component; and
in response to the oxygen level being above a predetermined threshold, lowering a torque generation rate of the engine, the torque generation rate specifying amount of torque generated per unit displacement of the pedal, wherein the engine generates an amount of torque based on the torque generation rate of the engine, wherein the component comprises a zeolite based catalyst.

14. The computer program product of claim 13, wherein the controller resets the torque generation rate of the engine after a predetermined duration since lowering the torque generation rate.

15. The computer program product of claim 13, wherein the predetermined threshold is a first predetermined threshold, and the controller, in response to the oxygen level being above a second predetermined threshold, delays the request for generating torque by a predetermined threshold.

16. The computer program product of claim 13, wherein the controller further monitors a temperature of the emissions control system, and limits the exposure of components of the emissions control system components to rich exhaust conditions in response to the temperature being above a predetermined temperature threshold.

17. The computer program product of claim 13, wherein determining the oxygen level stored by the component is based on an oxygen storage component model.

\* \* \* \* \*